US006378624B1

(12) United States Patent
Liu

(10) Patent No.: US 6,378,624 B1
(45) Date of Patent: Apr. 30, 2002

(54) DRAW VICE

(76) Inventor: Yang-Ting Liu, No. 76-1, Lin 4, Shang-Kuan Li, Yuan Li Town, Miao Li Hsien (TW)

( * ) Notice: Subject to any disclaimer, the term of this patent is extended or adjusted under 35 U.S.C. 154(b) by 46 days.

(21) Appl. No.: 09/620,530

(22) Filed: Jul. 20, 2000

(51) Int. Cl.[7] .................................................. B23C 5/26

(52) U.S. Cl. ......................... 173/216; 173/53; 173/213; 173/170; 173/171; 81/424; 269/283

(58) Field of Search ................................ 173/216, 213, 173/104, 171, 170, 105, 53, 55; 81/424; 408/53, 46, 104; 409/144; 269/283, 285, 244

(56) References Cited

U.S. PATENT DOCUMENTS 3,898,911 A * 8/1975 DeCaussin .................. 173/213
4,427,325 A * 1/1984 Kielma et al. ................ 408/53
5,174,386 A * 12/1992 Crover ......................... 173/55
5,255,579 A * 10/1993 Fortin .......................... 81/424
3,437,158 A * 4/1996 Proffer ........................ 173/213
5,623,858 A * 4/1997 Birkestrand ................. 408/104

* cited by examiner

*Primary Examiner*—Scott A. Smith
(74) *Attorney, Agent, or Firm*—Rosenberg, Klein & Lee

(57) ABSTRACT

A draw vice includes a body having two handles, a center tube mounted in the body and driven to rotate a workpiece, a center tube rotating device pivoted to the body and controlled to rotate the center tube, and a center tube locking device adapted to lock the center tube against rotary motion, wherein the center tube rotating device includes a shell pivoted to the handles, an input gear, an output gear coupled to the center tube, a knob coupled to the input gear and adapted to rotate the center tube, and at least one transmission gear means coupled between the input gear and the output gear for enabling the center tube and the output gear to be rotated at a speed of rotation higher than the input gear.

5 Claims, 6 Drawing Sheets

DRAW VICE

BACKGROUND OF THE INVENTION

The present invention relates to a draw vice, and more particularly to such a draw vice, which comprises a center tube, a center tube rotating device adapted to rotate the center tube and the workpiece attached to the center tube with less effort, and a center tube locking device adapted to stop the center tube against rotary motion.

A variety of draw vices have been disclosed, and have appeared on the market. Regular draw vices commonly comprise a center tube adapted for coupling to the workpiece through an adapter. When installed, the center tube is rotated upwards or downwards, enabling the workpiece to be dismounted or installed. According to conventional designs, rotating the center tube takes much time and labor. Further, in conventional designs, no locking means is provided for locking the center tube against rotary motion.

SUMMARY OF THE INVENTION

The invention has been accomplished to provide a draw vice, which eliminates the aforesaid drawbacks. According to one aspect of the present invention, the draw vice comprises a center tube mounted in the body thereof and driven to rotate the workpiece, a center tube rotating device pivoted to the body and controlled to rotate the center tube with less effort. The center tube rotating device comprises a shell pivoted to the handles, an input gear, an output gear coupled to the center tube, a knob coupled to the input gear and adapted to rotate the center tube, and at least one transmission gear means coupled between the input gear and the output gear for enabling the center tube and the output gear to be rotated at a speed of rotation higher than the input gear. According to another aspect of the present invention, the draw vice further comprises a center tube locking device adapted to lock the center tube against rotary motion.

DETAILED DESCRIPTION OF THE PREFERRED EMBODIMENT

Figure 1:
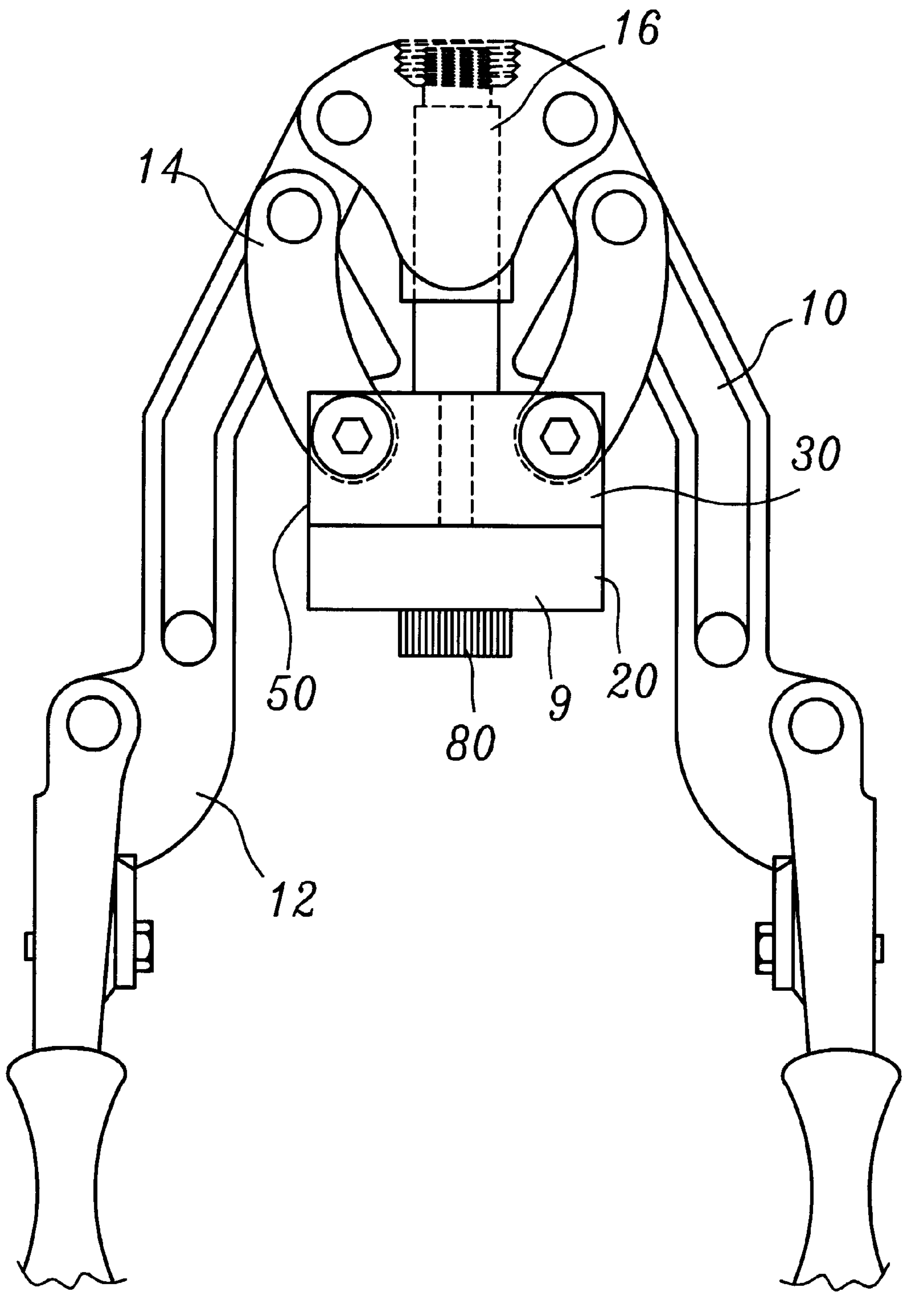
FIG. 1 is a plain view of a draw vice according to the present invention.

Referring to FIG. 1, a draw vice 1 is shown comprised of a body 10. The body 10 comprises two pivoted handles 12, a center tube 16 (according to the present preferred embodiment, the center tube 16 is a hexagonal tube) vertically inserted through the center thereof, a center tube rotating device 20, symmetrical pairs of links 14 bilaterally coupled between the handles 12 and the center tube rotating device 20, and a center tube locking device 30.

Figure 2:
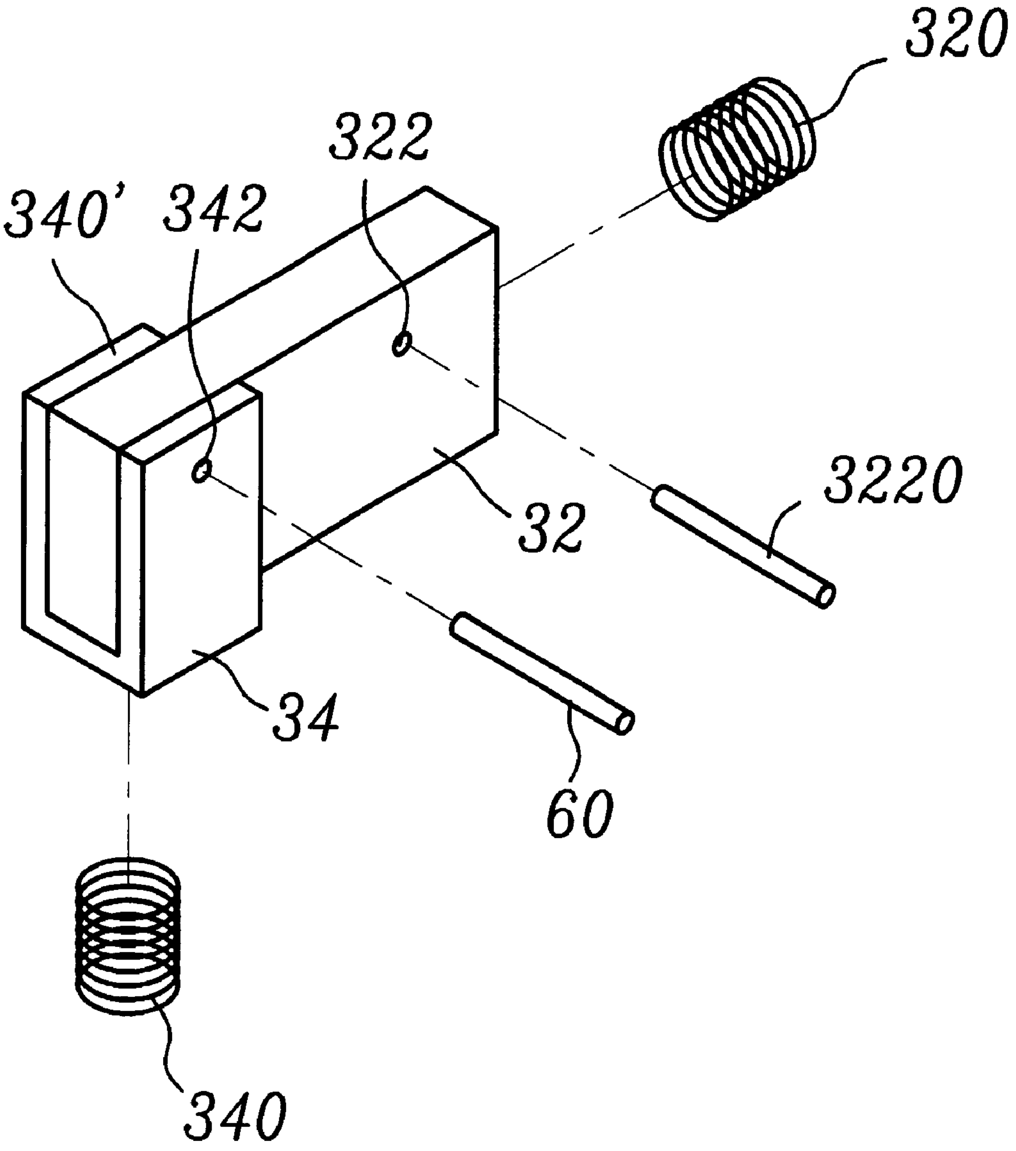
FIG. 2 is an exploded view of the center tube locking device for the draw vice according to the present invention.
Figure 3:
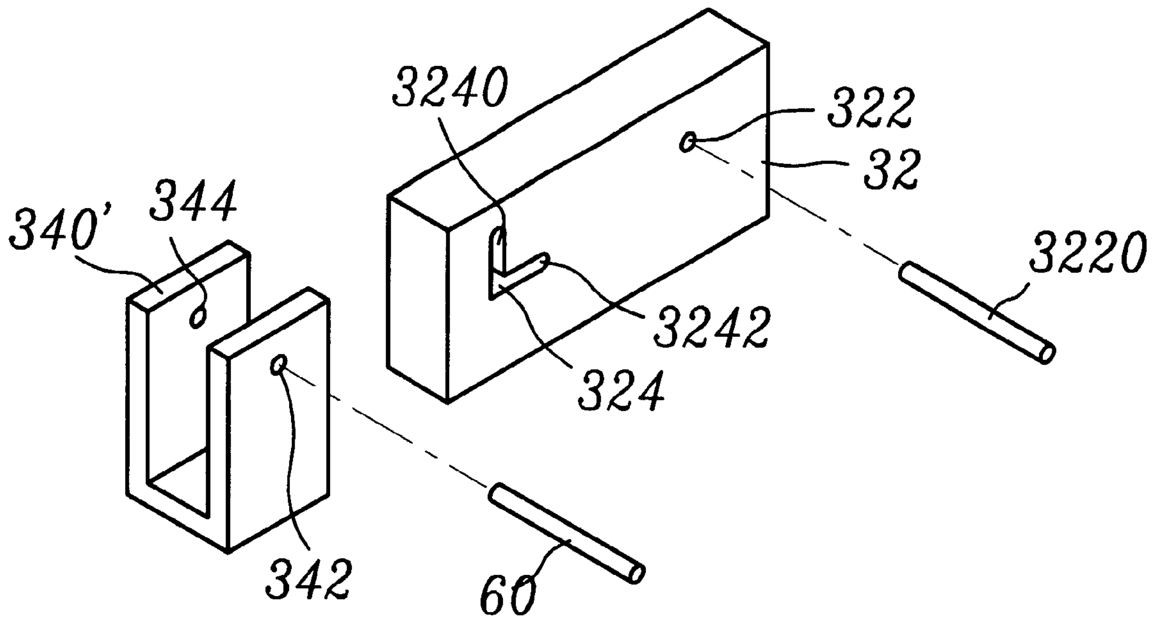
FIG. 3 is an exploded view of the locking bar and U-shaped stop plate of the center tube locking device according to the present invention.

Referring to FIGS. 2 and 3, the center tube locking device 30 is mounted inside a casing 50 pivoted to the links 14, and controlled to lock the center tube 16. When locked, the center tube 16 is prohibited from rotation. The center tube locking device 30 comprises a locking bar 32, a U-shaped stop plate 34, a first spring 320, and a second spring 340. The locking bar 32, the U-shaped stop plate 34 and the springs 320 and 340 are mounted inside the casing 50. The casing 50 has a transverse through hole 500 adapted to receive the center tube 16. The locking bar 32 has a rear end supported on the first spring 320, which is horizontally mounted on a rear side wall of the casing 50, a pin hole 322 near the rear end, and a L-shaped sliding slot 324 near the front end thereof. A first pin 3220 is fastened to the pin hole 322, and moved with the locking bar 32 between two distal ends of a horizontal sliding slot 502 on each of two lateral side walls of the casing 50. The second spring 340 is vertically mounted on the bottom sidewall of the casing 50. The U-shaped stop plate 34 is supported on the second spring 340, comprising two parallel arms 340', and two pivot holes 342 and 344 aligned at the parallel arms 340'. A second pin 60 is fastened to the pivot holes 342 and 344 of the U-shaped stop plate 34 and the L-shaped sliding slot 324 of the locking bar 32, having two opposite ends respectively inserted through two vertical sliding slots 504 on the two lateral side walls of the casing 50.

Figure 4:
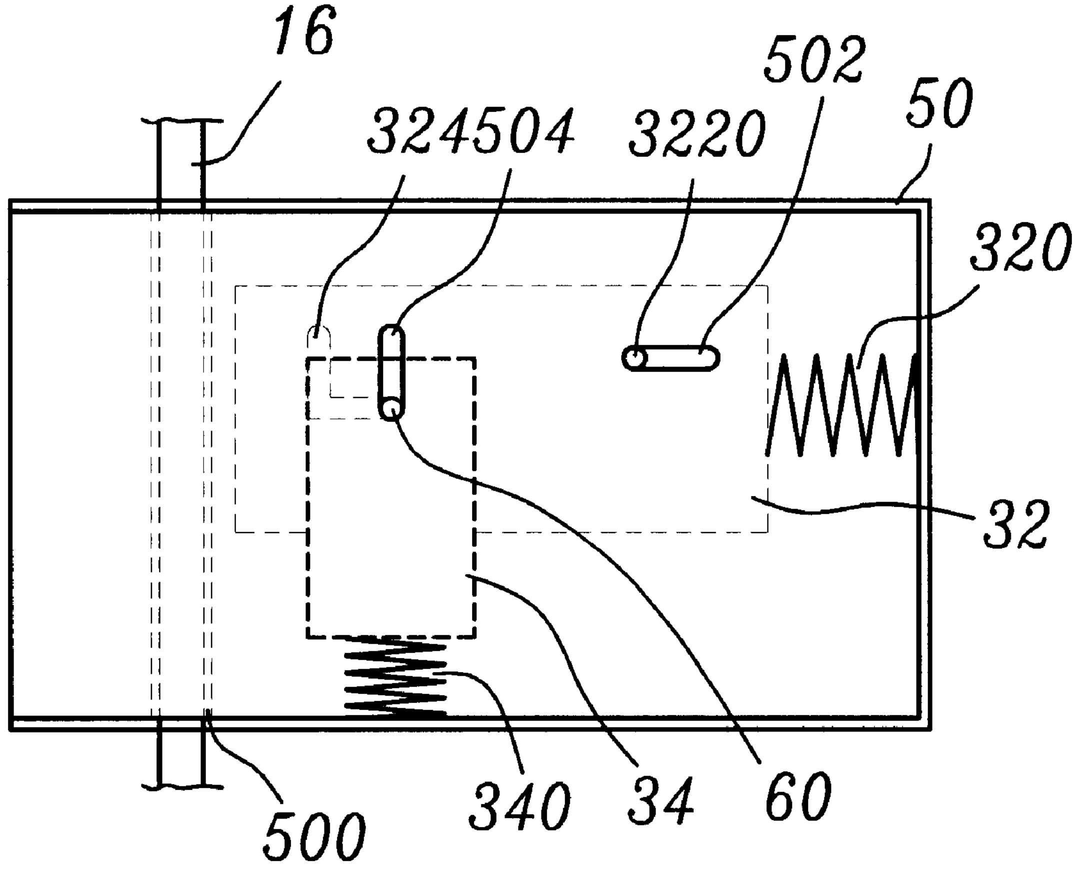
FIG. 4 is a sectional view of a part of the present invention, showing the locking position of the center tube locking device.
Figure 5:
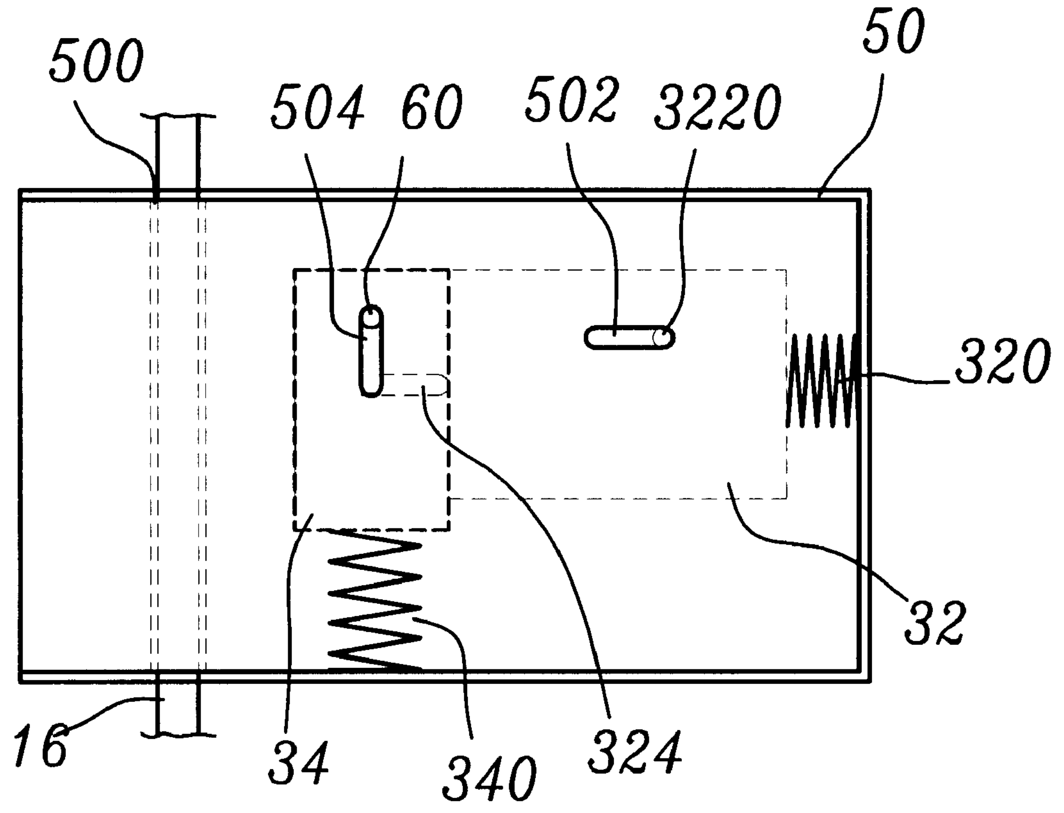
FIG. 5 is a sectional view of a part of the present invention, showing the unlocking position of the center tube locking device.

Referring to FIGS. 4 and 5, when the user pulls the first pin 3220 backwards to force the locking bar 32 against the first spring 320, the second pin 60 is stopped at the front end 3240 of the L-shaped sliding slot 324, the second spring 340 is released, and the front end of the locking bar 32 does not touch the center tube 16. When the user pulls the second pin 60 downwards to force the stop plate 34 against the second spring 340, the locking bar 32 is horizontally forced forwards by the first spring 320, enabling the second pin 60 to be stopped at the rear end 3242 of the L-shaped sliding slot 324, and at this time the front end of the locking bar 32 is stopped against the polygonal peripheral wall of the center tube 16, prohibiting the center tube 16 from rotary motion.

Figure 6:
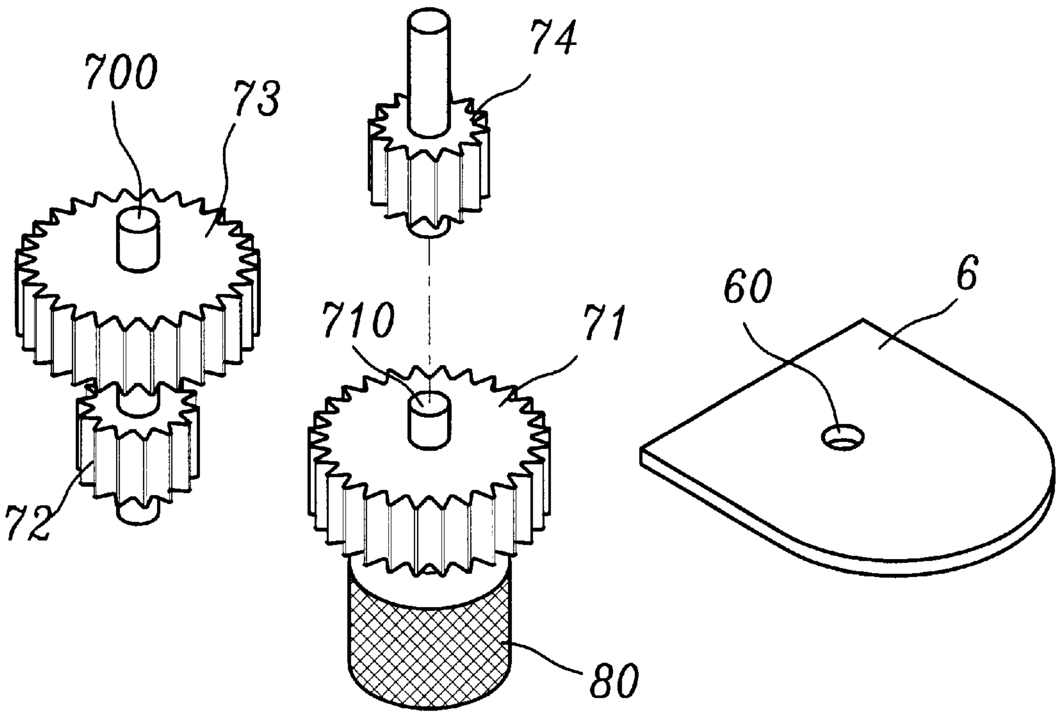
FIG. 6 is an exploded view of the center tube 1rotating device for the draw vice according to the present invention.

Referring to FIG. 6 and FIG. 1 again, the center tube rotating device 20 is mounted in a shell 9, comprising four gears of different diameters, namely, the first gear 71, the second gear 72, the third gear 73, and the fourth gear 74. The second gear 72 and the third gear 73 have a common gear shaft 700. The first gear 71 is an input gear. The fourth gear 74 is an output gear. The first gear 71 and the fourth gear 74 are respectively meshed with the second gear 72 and the third gear 73. The radius of the third gear 73 is greater than the second gear 72. The number of teeth of the third gear 73 is also greater than the second gear 72. Therefore, when the first gear 71 rotates through one turn, the fourth gear 74 rotates through more than one turn. The gear shaft 710 of the first gear 710 is inserted through the shell 9 and fastened to an adjustment knob 80 outside the shell 9. The center tube 16 is fixedly to the gear shaft of the fourth gear 74. When rotating the adjustment knob 80 through one turn, the center tube 16 is rotated through more than one turn. By means of this arrangement, the center tube 16 can be rotated efficiently with less effort. Further, the first gear 71 and the fourth gear 74 are pivoted to a respective pivot hole 60 on a support frame 6, which is fixedly mounted inside the shell 9.

As indicated above, the present invention provides a draw vice, which comprises a center tube 16, a center tube rotating device 20 adapted to rotate the center tube 16 and the workpiece attached to the center tube 16, and a center tube locking device 30 adapted to stop the center tube 16 against rotary motion.

It is to be understood that the drawings are designed for purposes of illustration only, and are not intended for use as a definition of the limits and scope of the invention disclosed.

What the invention claimed is:

1. A draw vice comprising:

a body, said body comprising two pivoted handles;

a center tube mounted in said body and driven to rotate a workpiece; and a center tube rotating device pivoted to said body and controlled to rotate said center tube, said center tube rotating device comprising a casing pivoted to said handles, an input gear, an output gear coupled to said center tube, a knob coupled to said input gear and adapted to rotate said center tube, and at least one transmission gear means coupled between said input gear and said output gear for enabling said center tube and said output gear to be rotated at a speed of rotation higher than said input gear.

2. The draw vice of claim 1 wherein said at least one transmission gear means each comprises a gear shaft, a small gear fixedly mounted on said gear shaft and coupled to said input gear, a big gear fixedly mounted on said gear shaft and coupled to said output gear, the number of teeth and radius of said big gear being greater than the number of teeth and radius of said small gear.

3. The draw vice of claim 1 wherein said center tube rotating device further comprises a support frame fixedly mounted inside said casing adapted to support said input gear and said output gear, said support frame having pivot holes to which said input gear and said output gar are pivoted respectively.

4. The draw vice of claim 1 further comprising a center tube locking device adapted to lock said center tube against rotation.

5. The draw vice of claim 4 wherein said center tube locking device comprises a shell pivoted to said handles, said shell having two lateral side walls, a front side wall, a rear side wall, a top side wall, a bottom side wall, two horizontal sliding slots aligned at said opposite lateral side walls near said rear side wall, two vertical sliding slots aligned at said opposite lateral side walls near said front side wall, and two through holes aligned at said top side wall and said bottom side wall near said front side wall and adapted to receive said center tube, a first spring member horizontally mounted said rear side wall inside said shell, a locking bar supported on said first spring member and moved horizontally between a front position where said locking bar stops said center tube from rotary motion and a rear position where said locking bar is spaced from said center tube for enabling said center tube to be rotated with said center tube rotating device, said locking bar comprising a pin hole near a rear end thereof and a L-shaped sliding slot near a front end thereof, a first pin fastened to the pin hole of said locking bar and moved with said locking bar between two distal ends of each of said horizontal sliding slots of said shell, a second spring member vertically mounted on said bottom side wall inside said shell, a U-shaped stop plate supported on said second spring member and moved vertically between a top position where said U-shaped stop plate stops said locking bar from forward movement and a bottom position where said U-shaped stop plate unlocks said locking bar for enabling said locking bar to be forced by said first spring member from said rear position to said front position to stop said center tube from rotary motion, and a second pin inserted through the L-shaped sliding slot of said locking bar and fixedly fastened to two distal ends of said U-shaped stop plate and moved with said U-shaped stop plate between two distal ends of each of said vertical sliding slots of said shell.

* * * * *